(12) United States Patent
Ito et al.

(10) Patent No.: US 12,202,153 B2
(45) Date of Patent: Jan. 21, 2025

(54) ROBOT OPERATION FOR A MOVING WORKPIECE

(71) Applicant: KABUSHIKI KAISHA YASKAWA DENKI, Kitakyushu (JP)

(72) Inventors: Toshiki Ito, Fukuoka (JP); Hiroshi Kumagai, Fukuoka (JP); Yukihiro Tobata, Fukuoka (JP); Hisashi Ideguchi, Fukuoka (JP); Keisuke Nakamura, Fukuoka (JP)

( * ) Notice: Subject to any disclaimer, the term of this patent is extended or adjusted under 35 U.S.C. 154(b) by 352 days.

(21) Appl. No.: 17/840,616

(22) Filed: Jun. 15, 2022

(65) Prior Publication Data

US 2022/0339791 A1 Oct. 27, 2022

Related U.S. Application Data

(63) Continuation of application No. PCT/JP2020/047245, filed on Dec. 17, 2020.

(60) Provisional application No. 62/948,820, filed on Dec. 17, 2019.

(51) Int. Cl.
*B25J 9/00* (2006.01)
*B25J 9/16* (2006.01)
*B25J 19/02* (2006.01)

(52) U.S. Cl.
CPC ........... *B25J 9/1697* (2013.01); *B25J 9/1664* (2013.01); *B25J 19/023* (2013.01)

(58) Field of Classification Search
None
See application file for complete search history.

(56) References Cited

U.S. PATENT DOCUMENTS

| 2007/0118250 | A1  | 5/2007 | Nagamatsu |
| 2010/0191372 | A1* | 7/2010 | Nihei ................ F16P 1/00 700/245 |
| 2013/0173051 | A1* | 7/2013 | Bellante ............ G05B 19/4182 700/230 |

(Continued)

FOREIGN PATENT DOCUMENTS

| JP | H6-028004 | 4/1994 |
| JP | H8-036410 | 2/1996 |

(Continued)

OTHER PUBLICATIONS

Office Action issued in Japanese Patent Application No. P2021-565653, dated Apr. 11, 2023 (with English partial translation).

(Continued)

*Primary Examiner* — Truc M Do
(74) *Attorney, Agent, or Firm* — SOEI PATENT & LAW FIRM

(57) ABSTRACT

A robot system includes: a conveying device configured to convey a workpiece; a robot configured to execute an operation on the workpiece; and circuitry configured to: identify a current position of the workpiece and an object area occupied by an object; identify an interlock area that moves with the current position of the workpiece being conveyed by the conveying device; check an overlap between the interlock area and the object area; and control the robot to execute the operation based on the current position of the workpiece in response to determining that the interlock area does not overlap the object area.

20 Claims, 14 Drawing Sheets

(56) References Cited

U.S. PATENT DOCUMENTS

| | | | | |
|---|---|---|---|---|
| 2013/0199010 A1* | 8/2013 | Osato | ................. | B25J 9/0084 |
| | | | | 29/283 |
| 2018/0056514 A1* | 3/2018 | Katou | ................. | B25J 9/0084 |
| 2018/0194573 A1* | 7/2018 | Iwai | ................. | B25J 9/1697 |
| 2018/0222052 A1* | 8/2018 | Vu | ................. | G01S 17/87 |
| 2019/0340909 A1* | 11/2019 | Nguyen | ................. | B25J 9/1676 |

FOREIGN PATENT DOCUMENTS

| | | |
|---|---|---|
| JP | H8-166809 | 6/1996 |
| JP | 2007-148527 | 6/2007 |
| JP | 2010-188515 | 9/2010 |
| JP | 4544145 | 9/2010 |
| JP | 2011-056607 | 3/2011 |
| JP | 2013-139075 | 7/2013 |
| JP | 2017-013180 | 1/2017 |

OTHER PUBLICATIONS

International Search Report dated Feb. 16, 2021 for PCT/JP2020/047245.
International Preliminary Report on Patentability with Written Opinion dated Jun. 30, 2022 for PCT/JP2020/047245.

* cited by examiner

*Fig.6*

| PART ID | PROGRESS |
|---------|----------|
| 92A | NOT FINISHED |
| 92B | NOT FINISHED |
| 92C | FINISHED |
| 92D | NOT FINISHED |
| 92E | RESERVED |
| 92F | NOT FINISHED |
| 92G | RESERVED |
| ... | ... |

ROBOT OPERATION FOR A MOVING WORKPIECE

CROSS-REFERENCE TO RELATED APPLICATIONS

This application is a continuation application of PCT Application No. PCT/JP2020/047245, filed on Dec. 17, 2020, which claims priority from U.S. Provisional Application No. 62/948,820, filed on Dec. 17, 2019, the entire contents of which are incorporated herein by reference.

BACKGROUND

Field

The present disclosure relates to a robot system, a controller, and a control method.

Description of the Related Art

Japanese Unexamined Patent Publication No. 2007-148527 discloses a robot interference avoidance method in which, for each of a plurality of robots, in a case where there is an interference area in which occupying area of the robot itself overlaps with an occupying area of another robot, the robot stops operation before entering the interference area inside its own occupying area when detecting that the other robot enters the interference area through communication with the other robot, and the robot resumes operation of moving to its own target position when the other robot exits from its own occupying area.

SUMMARY

Disclosed herein is a robot system. The robot system may include: a conveying device configured to convey a workpiece; a robot configured to execute an operation on the workpiece; and circuitry configured to: identify a current position of the workpiece and an object area occupied by an object; identify an interlock area that moves with the current position of the workpiece being conveyed by the conveying device; check an overlap between the interlock area and the object area; and control the robot to execute the operation based on the current position of the workpiece in response to determining that the interlock area does not overlap the object area.

Additionally, a controller is disclosed herein. The controller may include a circuitry configured to: identify an interlock area that moves with a current position of a workpiece being conveyed by a conveying device; check an overlap between the interlock area and an object area occupied by an object; and control a robot to execute an operation on the workpiece based on the current position of the workpiece in response to determining that the interlock area does not overlap the object area.

Additionally, a control method is disclosed herein. The control method may include: identifying an interlock area that moves with a current position of a workpiece being conveyed by a conveying device; checking an overlap between the interlock area and an object area occupied by an object; and controlling a robot to execute an operation on the workpiece based on the current position of the workpiece in response to determining that the interlock area does not overlap the object area.

BRIEF DESCRIPTION OF THE DRAWINGS

FIG. 6 is a table illustrating example progress data.

DETAILED DESCRIPTION

In the following description, with reference to the drawings, the same reference numbers are assigned to the same components or to similar components having the same function, and overlapping description is omitted.

Robot System

Figure 1:
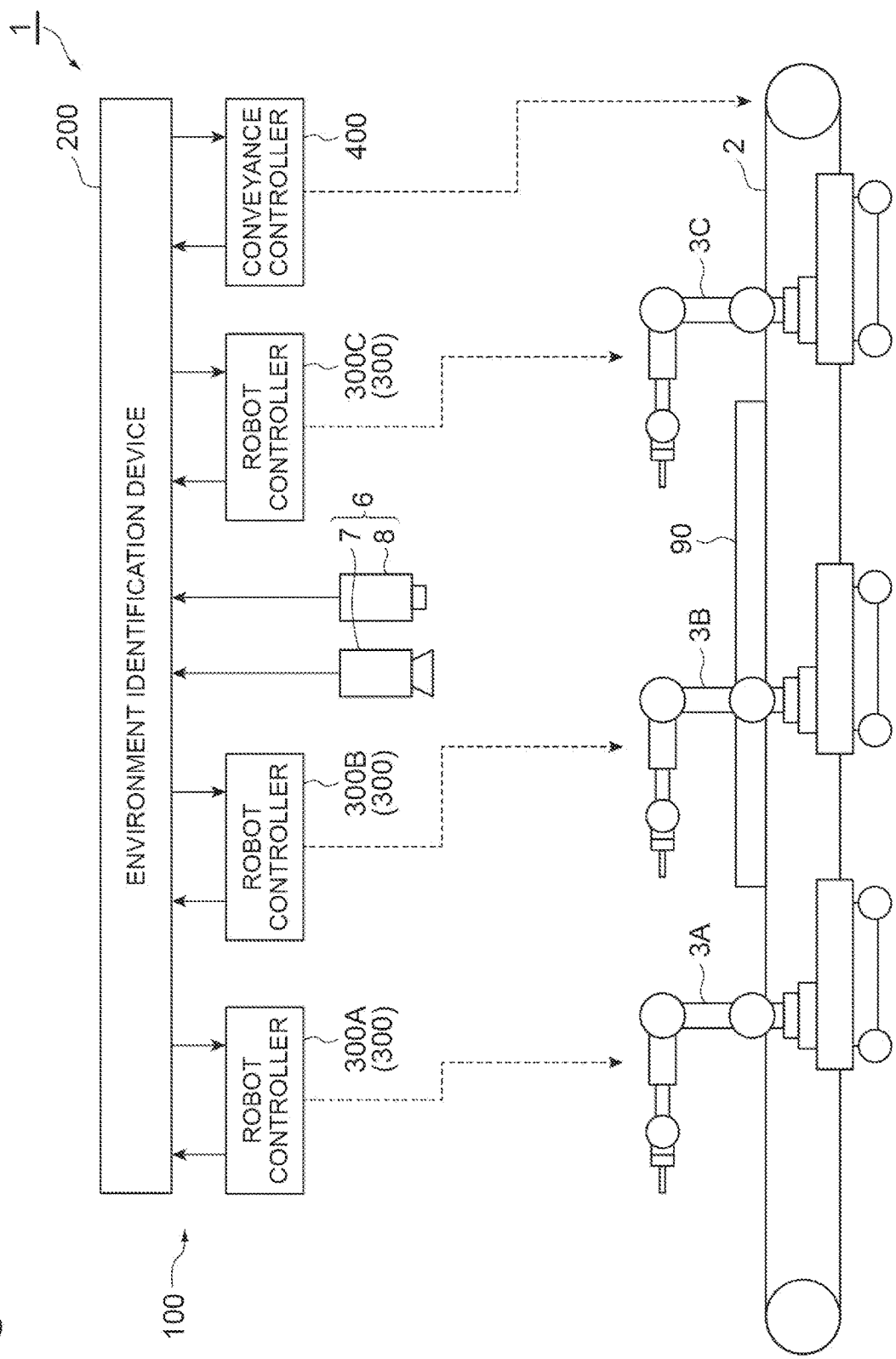
FIG. 1 is a schematic diagram illustrating an example overall configuration of a robot system.

A robot system 1 illustrated in FIG. 1 is a system for producing a workpiece by cooperation of a conveying device and at least one robot. Hereinafter, in the production process of the workpiece, all objects that are operation targets of each local device are referred to as "workpieces". For example, the term "workpiece" includes a final product in the robot system 1, a component of the final product, and a unit obtained by combining a plurality of components. As an example, the robot system 1 includes a conveying device 2, a plurality of (for example, three) robots 3A, 3B, and 3C, and a control system 100.

The conveying device 2 conveys a workpiece 90 by the power of an electric motor or the like, for example. As an example, the conveying device 2 conveys the workpiece 90 in one direction along a horizontal plane. Specific examples of such the conveying device 2 include a belt conveyor and a roller conveyor.

Each of the robots 3A, 3B, and 3C performs a predetermined operation on the workpiece 90 conveyed by the conveying device 2. The robots 3A, 3B, and 3C may include two or more robots whose operation ranges overlap each other. As an example, the robot 3B performs operation on the workpiece 90 in an operation range overlapping an operation range of the robot 3A, and the robot 3C performs operation on the workpiece 90 in an operation range overlapping the operation range of the robot 3A and the operation range of the robot 3B. Specific examples of the operation performed on the workpiece 90 include assembly of another workpiece 90 (for example, a sub-part) to the workpiece 90 (for example, a base part) conveyed by the conveying device 2, and fastening (for example, bolt fastening) and joining (for example, welding) of parts in the workpiece 90 conveyed by the conveying device 2.

Figure 2:
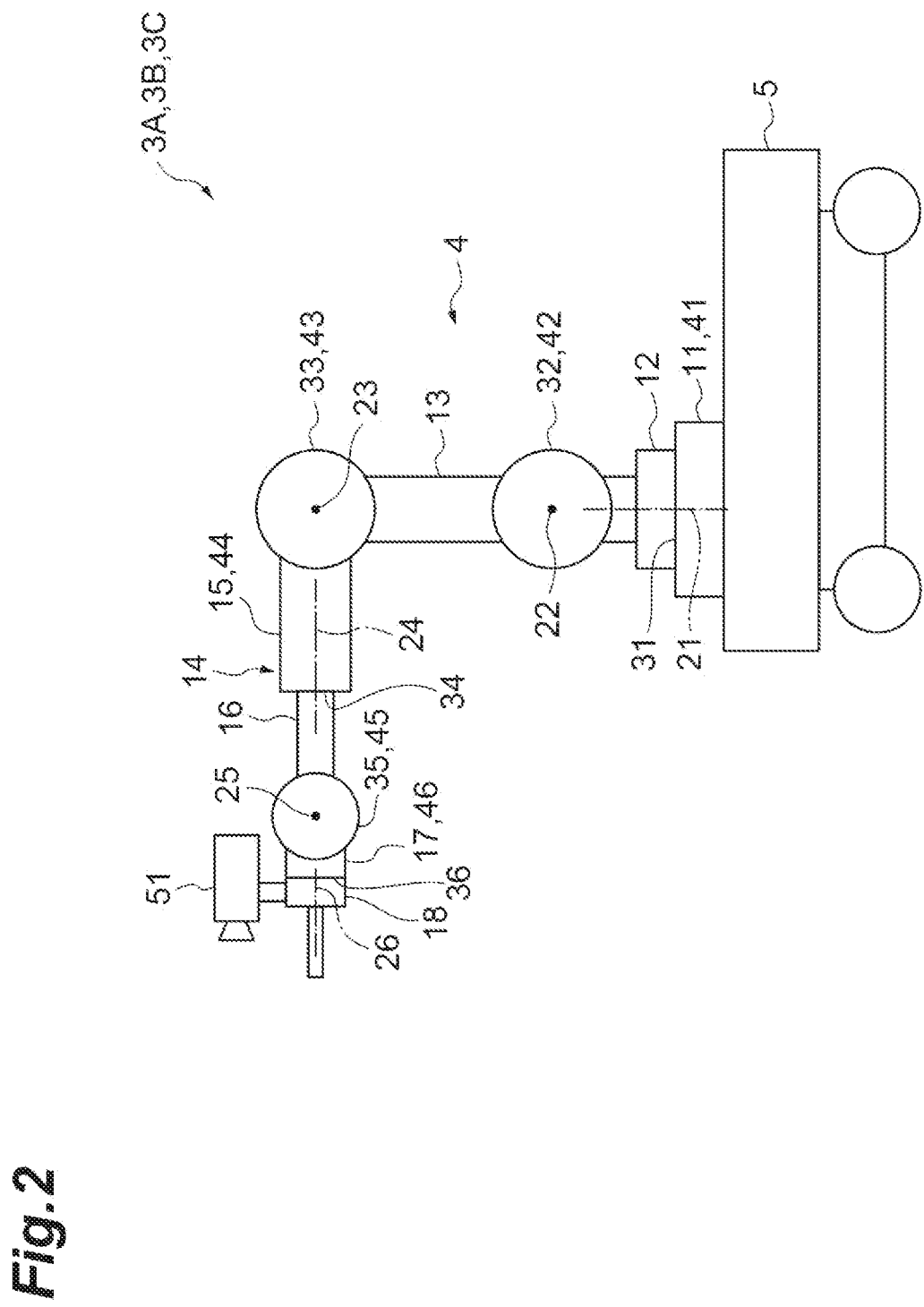
FIG. 2 is a schematic diagram illustrating an example configuration of a robot.

At least one of the robots 3A, 3B, and 3C may be a robot capable of autonomous traveling. FIG. 1 illustrates a case where all of the robots 3A, 3B, and 3C are capable of autonomous traveling. As illustrated in FIG. 2, each of the robots 3A, 3B, and 3C includes a robot body 4 and a conveying carriage 5. The conveying carriage 5 (a carriage) holds the robot body 4 and autonomously travels around the conveying device 2 to carry the robot body 4. Specific examples of the conveying carriage 5 include so-called electric automated guided vehicles (AGVs).

The robot body 4 is a six-axis vertical articulated robot, and includes a base 11, a turning part 12, a first arm 13, a second arm 14, a third arm 17, a tip 18, and actuators 41, 42, 43, 44, 45, and 46.

The base 11 is fixed on the conveying carriage 5. The turning part 12 is provided on the base 11 so as to pivot about a vertical axis 21. The first arm 13 is connected to the turning part 12 so as to swing about an axis 22 that intersects (for example, is orthogonal to) the axis 21. Intersecting includes a case where there is a twisted relationship such as so-called three-dimensional crossing. The second arm 14 is connected to the tip of the first arm 13 so as to swing about an axis 23 that is substantially parallel to the axis 22. The second arm 14 includes an arm base 15 and an arm end 16. The arm base 15 is connected to the tip of the first arm 13 and extends along an axis 24 that intersects (for example, is orthogonal to) the axis 23. The arm end 16 is connected to the tip of the arm base 15 so as to pivot about the axis 24. The third arm 17 is connected to the tip of the arm end 16 so as to swing about an axis 25 that intersects (for example, is orthogonal to) the axis 24. The tip 18 is connected to the tip of the third arm 17 so as to pivot about an axis 26 that intersects (for example, is orthogonal to) the axis 25.

As described above, the robot body 4 includes a joint 31 connecting the base 11 and the turning part 12, a joint 32 connecting the turning part 12 and the first arm 13, a joint 33 connecting the first arm 13 and the second arm 14, a joint 34 connecting the arm base 15 and the arm end 16 in the second arm 14, a joint 35 connecting the arm end 16 and the third arm 17, and a joint 36 connecting the third arm 17 and the tip 18.

The actuators 41, 42, 43, 44, 45, and 46 include, for example, an electric motor and a speed reducer, and drives the joints 31, 32, 33, 34, 35, and 36, respectively. For example, the actuator 41 turns the turning part 12 around the axis 21, the actuator 42 swings the first arm 13 around the axis 22, the actuator 43 swings the second arm 14 around the axis 23, the actuator 44 turns the arm end 16 around the axis 24, the actuator 45 swings the third arm 17 around the axis 25, and the actuator 46 turns the tip 18 around the axis 26.

The tip 18 is provided with a work tool. Specific examples of the work tool include a holding tool that holds an object by gripping or suction, a screw tightening tool, and a welding torch. The robot body 4 adjusts the position and the posture of the work tool within a movable range by driving the joints 31, 32, 33, 34, 35, and 36 with the actuators 41, 42, 43, 44, 45, and 46, respectively.

Specific configurations of the robots 3A, the 3B, and the 3C may be modified. For example, each of the robots 3A, 3B, and 3C may be a seven-axis redundant robot in which one joint is added to the six-axis vertical articulated robot, or may be a so-called SCARA type articulated robot. The robots 3A, 3B, and 3C may not be capable of autonomous traveling, and the base 11 may be fixed around the conveying device 2.

Each of the robots 3A, 3B, and 3C may further include an operation target camera 51. The operation target camera 51 (an operation target imaging device) images an operation area of the robot body 4 to generate operation target image data. Specific examples of the operation target camera 51 include an electronic camera including a solid-state imaging device such as a charge coupled device (CCD) image sensor or a complementary metal-oxide-semiconductor (CMOS) image sensor and an optical system that forms an image of the operation area on the imaging device.

For example, the operation target camera 51 is attached to the tip 18 together with the work tool. Accordingly, when the work tool is directed to the operation area, the operation target camera 51 can be directed to the operation area, and the operation area can be more reliably imaged. The installation position of the operation target camera 51 may not be limited to the tip 18. The operation target camera 51 may be provided in any part of the robots 3A, 3B, and 3C as long as the operation area can be imaged.

The robot system 1 may further comprise an environment imaging device 6. The environment imaging device 6 images a target area including the workpiece 90 conveyed by the conveying device 2 to generate environment image data. The environment image data may be of an imaging target including the workpiece conveyed by the conveying device 2 and the object. For example, the environment imaging device 6 images the conveying device 2 from vertically above.

The environment imaging device 6 may be configured to generate a plurality of types of image data. For example, the environment imaging device 6 may generate environment image data including distance image data for the target area and luminance image data. The luminance image is a two-dimensional image in which the brightness of each part in the target area is represented by a color distribution. The distance image is a two-dimensional image in which the distance to each part in the target area is represented by a color distribution. Representing by the color distribution means representing by a distribution of at least one of three attributes of color (hue, brightness, and saturation).

For example, the environment imaging device 6 includes a luminance camera 7 that generates the luminance image data and a distance camera 8 that generates the distance image data. Specific examples of the luminance camera 7 include an electronic camera including a solid-state imaging device such as a charge coupled device (CCD) image sensor or a complementary metal-oxide-semiconductor (CMOS) image sensor and an optical system that forms an image of the operation area on the imaging element. Specific examples of the distance camera 8 include a time-of-flight (TOF) camera that obtains range information based on the time from when infrared light or the like is emitted to the target area until the reflection light returns. For example, the distance image data may include first pixels each of which is associated with a distance from the distance camera 8 to a portion of the imaging target. the luminance image data may include second pixels each of which is associated with a luminance of a portion of the imaging target. The environment imaging device 6 may not generate a plurality of types of image data, and may be configured to generate luminance image data.

The control system 100 (circuitry) include an environment identification device 200, a robot controller 300, and a conveyance controller 400. The conveyance controller 400 controls the conveying device 2 so as to convey the workpiece 90 at a predetermined speed, for example. The environment identification device 200 identifies the current position of the workpiece 90 in the conveying device 2 and one or more occupying areas of one or more objects in the vicinity of the workpiece 90. For example, the one or more occupying areas include an object area occupied by an object. The one or more objects may include the robots 3A, 3B, and 3C. The one or more objects may include a device other than the robots 3A, 3B, and 3C, or may be a human worker (person) who cooperates with the robots 3A, 3B, and 3C.

Figure 3:
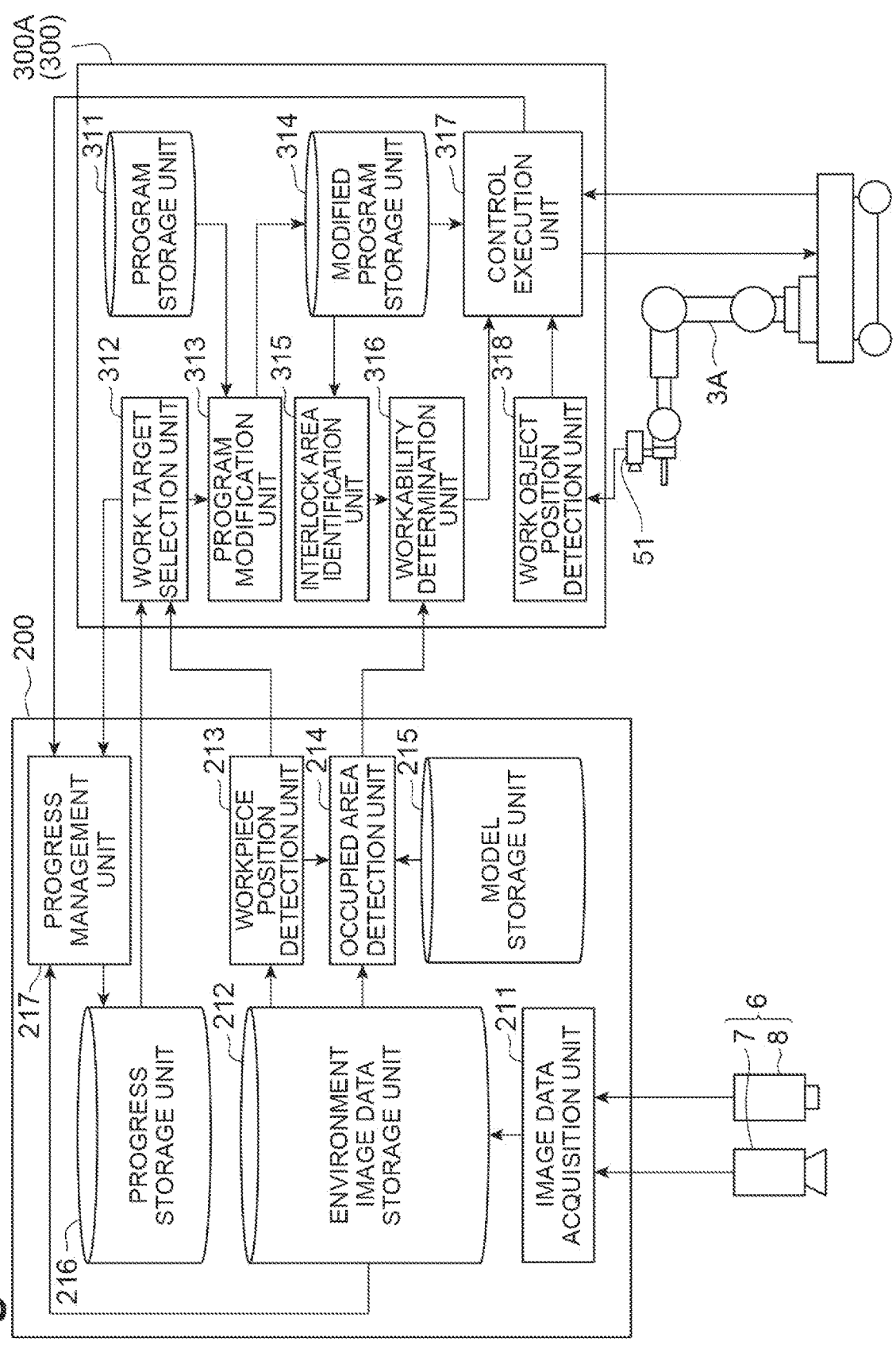
FIG. 3 is a block diagram illustrating an example configuration of an environment identification device and a robot controller.

The environment identification device 200 may be configured to identify a current position of the workpiece 90 and an occupying area of the one or more objects based on the image data generated by the environment imaging device 6. For example, as illustrated in FIG. 3, the environment identification device 200 includes an image data acquisition unit 211, an environment image data storage unit 212, a workpiece position detection unit 213, and an occupying area detection unit 214 as functional components (hereinafter referred to as "functional block").

The image data acquisition unit 211 acquires the environment image data generated by the environment imaging device 6. The environment image data storage unit 212 stores the environment image data acquired by the image data acquisition unit 211. The workpiece position detection unit 213 identifies the current position of the workpiece 90 based on environment image data. The workpiece position detection unit 213 may identify the current position of the workpiece 90 based on the luminance image data. The workpiece position detection unit 213 recognizes the marker attached to the workpiece 90 based on the luminance image data, and identifies the current position of the workpiece 90 based on the position of the marker in the target area (the imaging target area by the environment imaging device 6).

Figure 4:
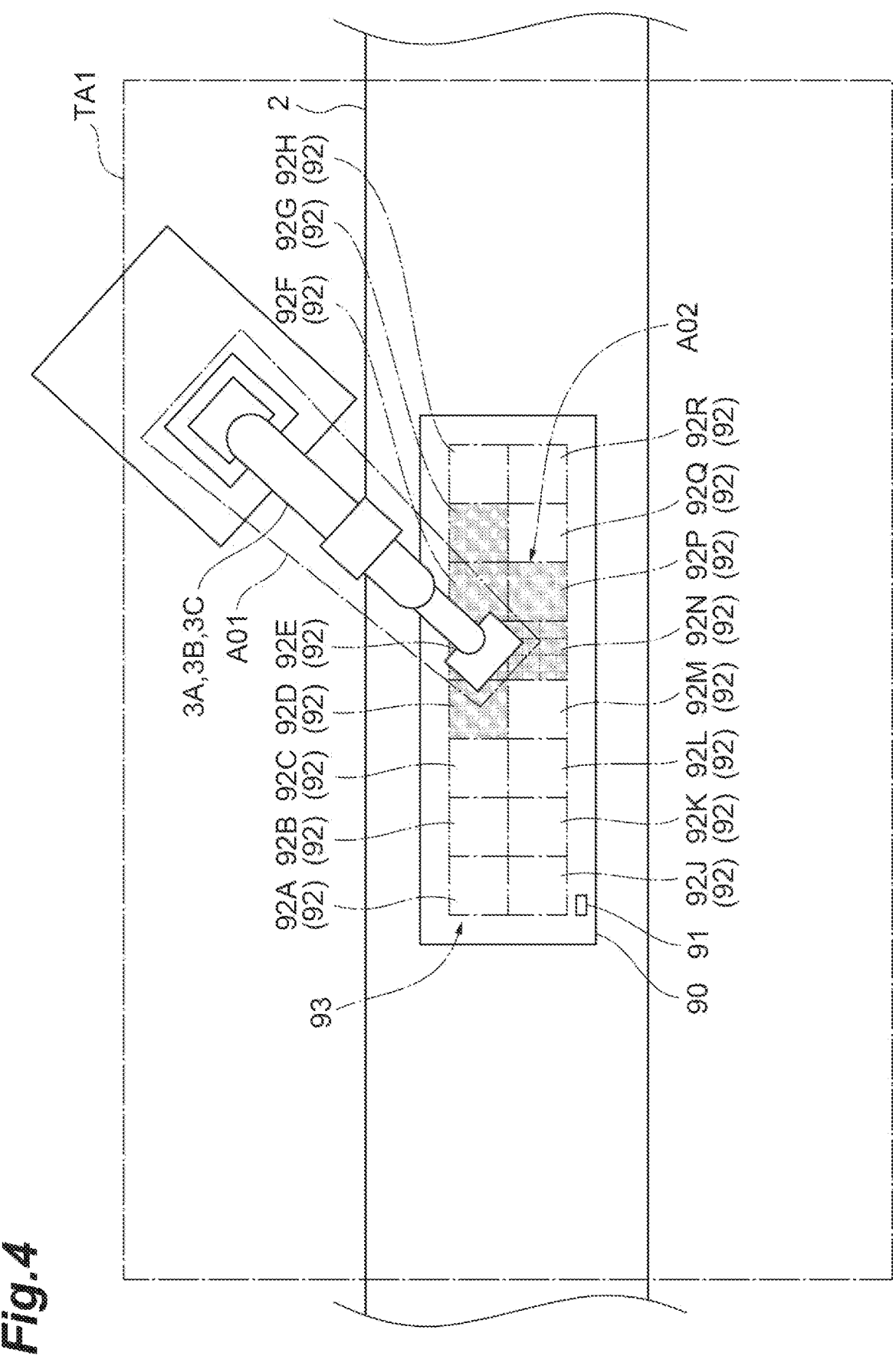
FIG. 4 is a schematic diagram illustrating an example occupying area of a robot.

FIG. 4 is a view of the conveying device 2 viewed from vertically above, and the environment imaging device 6 images a target area TA1 in the figure. The workpiece 90 includes a plurality of operation target parts 92. The operation target parts 92 are a target site of operation performed by the robots 3A, 3B, 3C, or the worker. There is no particular limitation on the operation performed on the operation target part 92. For example, the robots 3A, 3B, 3C, or the worker performs an operation of assembling a component to the operation target part 92.

A marker 91 is attached to the workpiece 90. For example, the marker 91 is attached to a position that is not included in the plurality of the operation target parts 92 in the workpiece 90. The marker 91 may be anything as long as it is recognizable by image processing. Specific examples of the marker 91 include a two-dimensional bar code. In the example of FIG. 4, the workpiece position detection unit 213 identifies the current position of the workpiece 90 based on the position of the marker 91 in the target area TA1. The workpiece position detection unit 213 may identify the current position of the workpiece 90 by recognizing a feature on the workpiece 90 (for example, circular unevenness) or the workpiece 90 itself through image processing instead of the marker 91.

Returning to FIG. 3, the occupying area detection unit 214 identifies the occupying area of one or more objects based on the environment image data. The occupying area detection unit 214 may identify the current position of the workpiece 90 based on the distance image data and the luminance image data. The occupying area detection unit 214 may identify the occupying area of the one or more objects in a check target area (for example a boundary of the workpiece 90) that moves together with the workpiece 90. The check target area may include a plurality of sections, and the occupying area detection unit 214 may identify an occupying area of the one or more objects in a unit of the plurality of sections. For example, the occupying area detection unit 214 may define the occupying area based on a second set of the plurality of sections.

FIG. 4 illustrates the result of identifying the occupying area of the robot 3A by the occupying area detection unit 214. In the example of FIG. 4, a check target area 93 is defined to include all the operation target parts 92 of the workpiece 90. The check target area 93 includes a plurality of the operation target parts 92 as a plurality of sections. The plurality of sections may not correspond to the plurality of operation target parts 92, and may be subdivided more than the plurality of operation target parts 92.

The occupying area detection unit 214 identifies a containing area A01 so as to include the robot body 4 of the robot 3A based on the environment image data, and identifies an overlapping area of the check target area 93 and the containing area A01 as an occupying area A02 of the robot 3A in the check target area 93.

At this time, the occupying area detection unit 214 identifies the occupying area A02 in a unit of a plurality of sections. For example, the occupying area detection unit 214 identifies operation target parts 92D, 92E, 92F, 92G, 92N, and 92P (a first set of the plurality of sections) overlapping the containing area A01 among the plurality of operation target parts 92 as the occupying area A02 of the robot 3A in the check target area 93.

Figure 5:
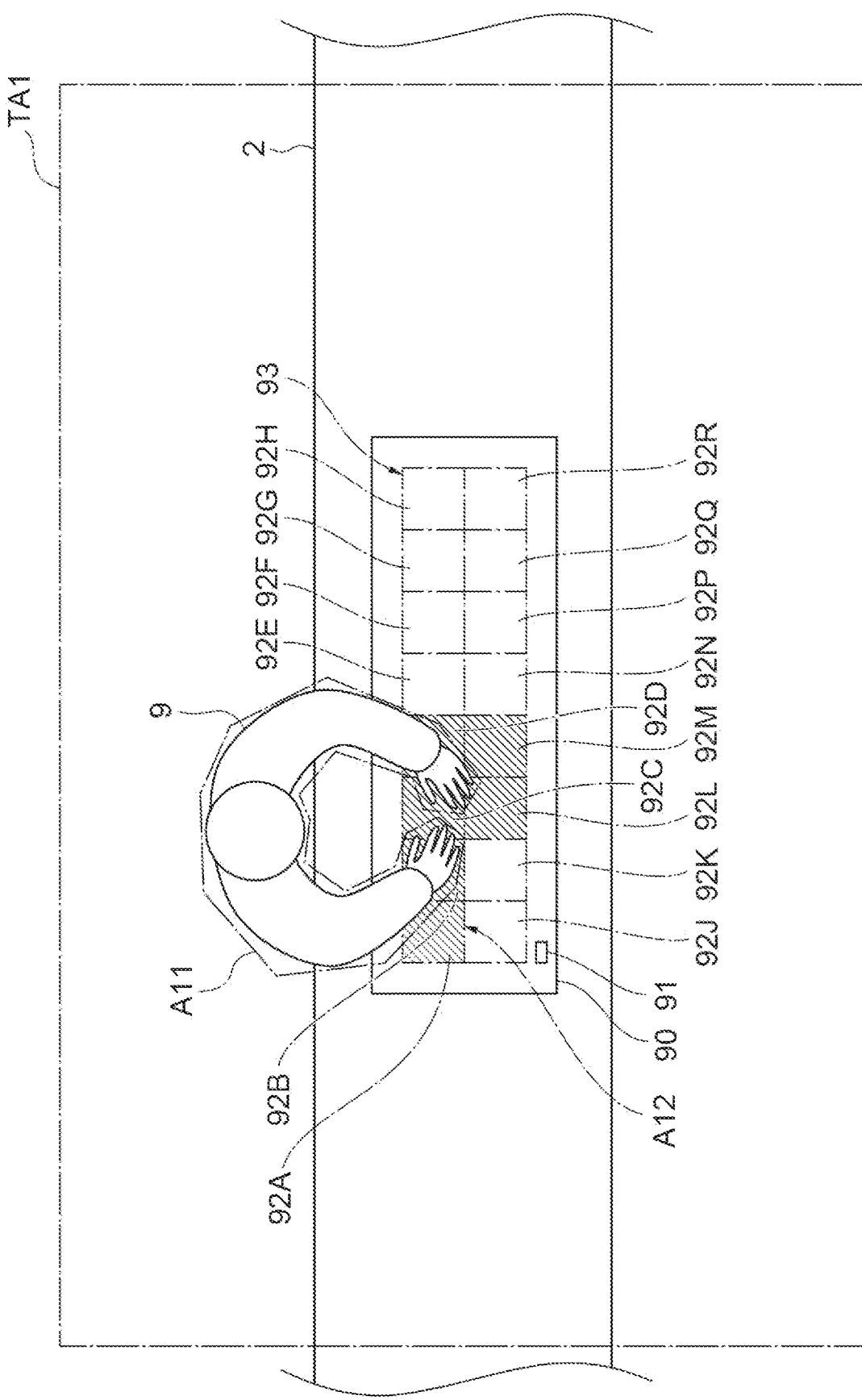
FIG. 5 is a schematic diagram illustrating an example occupying area of a worker.

FIG. 5 illustrates an example result of identifying an occupying area (a human occupying area) occupied by a worker 9 by the occupying area detection unit 214. The occupying area detection unit 214 identifies a containing area A11 so as to include the worker 9 based on the environment image data, and identifies the overlapping region of the check target area 93 and the containing area A11 as an occupying area A12 of the worker 9 in the check target area 93.

At this time, the occupying area detection unit 214 identifies the occupying area A12 in a unit of a plurality of sections. For example, the occupying area detection unit 214 identifies operation target parts 92A, 92B, 92C, 92D, 92L, and 92M (a first set of the plurality of sections) overlapping the containing area A11 among the plurality of operation target parts 92 as the occupying area A12 of the worker 9 in the check target area 93.

The environment identification device 200 may be configured to output the occupying area of the one or more objects based on new distance image data, luminance image data, and an image recognition model generated through machine learning so as to output the occupying area of the one or more objects based on input data including the distance image data and the luminance image data.

For example, the environment identification device 200 further includes a model storage unit 215. The model storage unit 215 stores the image recognition model. Specific examples of the image recognition model include a neural network that outputs coordinate point sequence data (an output vector) representing an occupying area of one or more objects in response to input of distance image data and luminance image data (an input vector).

The neural network has an input layer, one or more intermediate layers, and an output layer. The input layer outputs the input vector as it is to the next intermediate layer. The intermediate layer converts an input from the previous layer with an activation function and outputs the result to the next layer. The output layer converts an input from an intermediate layer farthest from the input layer with an activation function and outputs the conversion result as the output vector. Such a neural network is generated by optimizing an activation function of each layer based on learning data in which a teacher data set in which an input vector and an output vector are associated with each other is accumulated.

The occupying area detection unit 214 identifies a new occupying area of the one or more objects by inputting new distance image data and luminance image data to the image recognition model stored in the model storage unit 215.

The occupying area of the one or more objects may be identified without using the image recognition model by machine learning. The occupying area detection unit 214 may identify the occupying area of the one or more objects by a method that does not depend on machine learning, such as boundary recognition in an image by pattern matching or the like.

The environment identification device 200 may be configured to store progress information of operation performed on the workpiece 90 and to update the progress information in accordance with the progress of actual operation. For example, the environment identification device 200 further includes a progress storage unit 216 and a progress management unit 217.

The progress storage unit 216 stores progress information of the operation performed on the operation target part 92. For example, as illustrated in FIG. 6, the progress storage unit 216 stores progress information of operation for each of the plurality of operation target parts 92. The progress information in the FIG. 6 is represented by "not finished", "finished", and "reserved". "Not finished" means that the operation has not been completed. "Finished" means that the operation has been completed. "Reserved" means that any one of the robots 3A, 3B, and 3C is scheduled to perform operation.

The progress management unit 217 updates the progress information stored in the progress storage unit 216 in accordance with the progress of the actual operation. For example, the progress management unit 217 updates the progress information based on the control status of the robots 3A, 3B, and 3C by robot controllers 300A, 300B, and 300C, which will be described later, and the environment image data.

The robot controller 300 (a controller) controls the robots 3A, 3B, and 3C to execute an operation on the workpiece 90. When the robot system 1 includes a plurality of robots 3A, 3B, and 3C, the control system 100 may include a plurality of robot controllers 300 that control the plurality of robots 3A, 3B, and 3C, respectively. As an example, the robot controller 300 includes the robot controllers 300A, 300B, and 300C that control the robots 3A, 3B, and 3C, respectively.

The robot controller 300A is configured to: identify an interlock area that moves together with the workpiece 90 based on the current position of the workpiece 90; determine whether the robot 3A can execute operation on the workpiece 90 based on whether the interlock area overlaps an occupying area of an object other than the robot 3A; and control the robot 3A to execute operation on the workpiece 90 based on the current position of the workpiece 90 when it is determined that the operation is possible.

As illustrated in FIG. 3, the robot controller 300A includes a program storage unit 311, an operation target selection unit 312, a program modification unit 313, a modified program storage unit 314, an interlock area identification unit 315, a workability determination unit 316, and a control execution unit 317 as functional blocks.

The program storage unit 311 stores an operation program generated in advance to control the robot 3A to execute operation on the workpiece 90. For example, the program storage unit 311 stores two or more operation programs generated for every two or more operation target parts 92 (hereinafter referred to as "two or more territory parts") among the plurality of operation target parts 92. All the operation target parts 92 may be the territory part. The operation program may include a plurality of sequential target positions of the robot 3A. For example, the operation program includes a plurality of motion commands arranged in time series. Each of the plurality of motion commands includes a target position and a target posture of the tip 18.

The operation target selection unit 312 selects one of the two or more territory parts based on the progress information stored in the progress storage unit 216, the current position of the workpiece 90 identified by the workpiece position detection unit 213, and the current position of the robot 3A. For example, the operation target selection unit 312 selects a part whose operation has not been completed and which is located closest to the robot 3A from among two or more territory parts. Hereinafter, the selected part is referred to as a "selected part".

The program modification unit 313 modifies the operation program for the selected part based on the current location of the workpiece 90. For example, the operation program is generated on the assumption that the workpiece 90 is at a predetermined reference position (fixed reference position relative to the conveying device 2). For example, each of the target positions of the operation program may be associated with the fixed reference position. The program modification unit 313 modifies the target position and the target posture in each of the plurality of motion commands based on the difference between the reference position and the current position.

The modified program storage unit 314 stores the operation program modified by the program modification unit 313. Hereinafter, the operation program stored in the modified program storage unit 314 is referred to as a "modified program".

The interlock area identification unit 315 identifies an interlock area that moves together with the workpiece 90 based on the current position of the workpiece 90. The interlock area is an area in which the presence of another object is not allowed when the robot 3A performs the operation on the selected part. As an example of the fact that the presence of another object cannot be allowed, when another object exists in the interlock area, a collision between the other object and the robot 3A may occur.

The interlock area identification unit 315 may identify a planned occupying area of the robot 3A (an operation area occupied by the robot 3A) during execution of an operation on the workpiece 90 based on the modified program, and may identify the interlock area based on the planned occupying area. The interlock area identification unit 315 may identify the interlock area in a unit of a plurality of sections of the check target area. For example, the interlock area identification unit 315 may define the interlock area based on a second set of the plurality of sections.

Figure 7A:
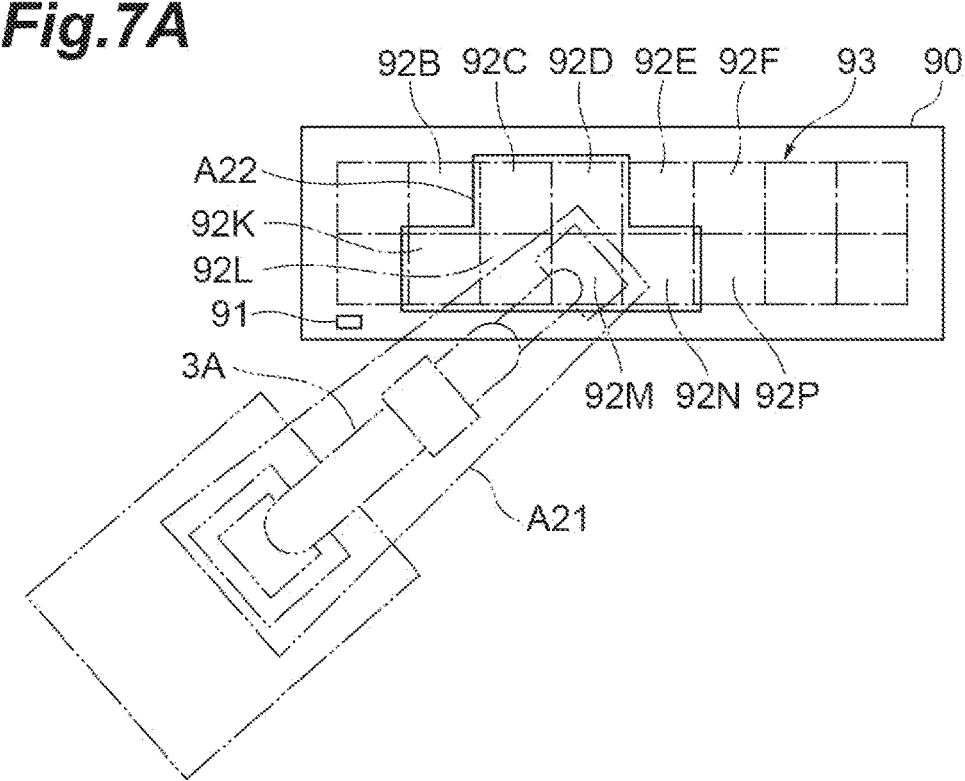
FIGS. 7A and 7B are schematic diagrams illustrating an example interlock area.

FIG. 7A illustrates an example identification result of the interlock area by the interlock area identification unit 315. Based on the modified program, the interlock area identification unit 315 identifies a planned occupying area A21 of the robot 3A in the case of executing an operation on an operation target part 92M that is the selected part, and identifies the overlapping region of the check target area 93 and the planned occupying area A21 as an interlock area A22.

At this time, the interlock area identification unit 315 identifies the interlock area A22 in a unit of a plurality of sections. For example, the interlock area identification unit 315 identifies operation target parts 92C, 92D, 92K, 92L, 92M, and 92N (second set of the plurality of sections) overlapping the planned occupying area A21 among the plurality of operation target parts 92 as the interlock area A22.

Figure 7B:
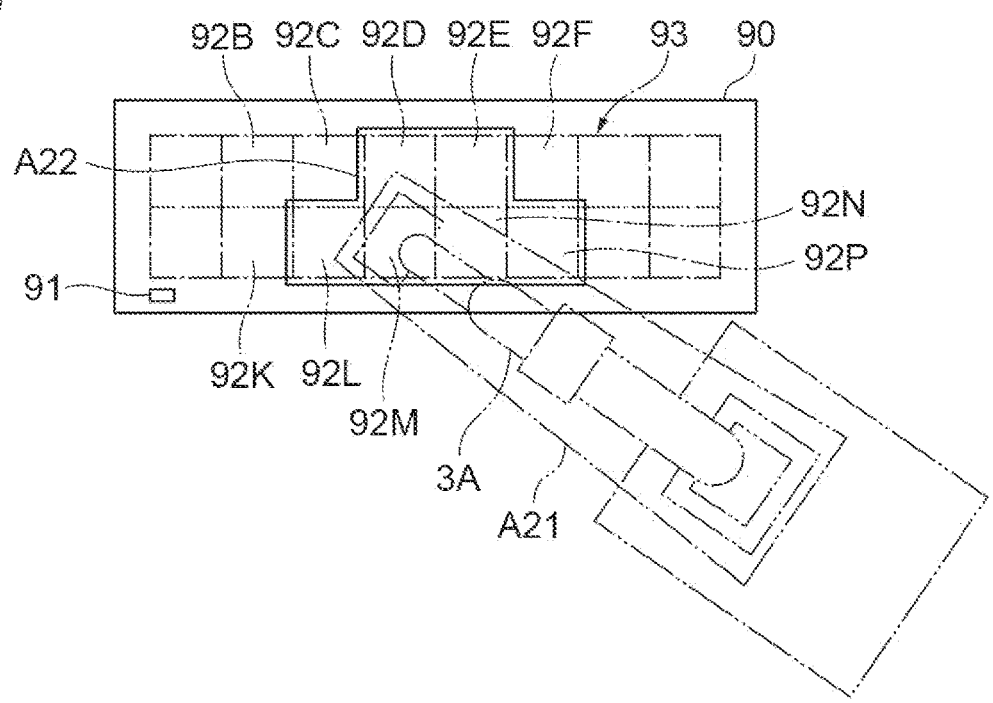

Even if the parts to be executed operations on is the same, the interlock area may change depending on the arrangement of the robot 3A. For example, FIG. 7B illustrates that the interlock area A22 changes depending on the arrangement of the robot 3A even when the operation is performed on the same work target part 92M as FIG. 7A. For example, in FIGS. 7B, 92D, 92E, 92L, 92M, 92N, and 92P (second set of the plurality of sections) are selected as the interlock area A22.

The robot 3A may be configured to act on a work position. The interlock area identification unit 315 may detect the work position based on the current position of the workpiece 90 and identify the interlock area so as to surround the work position with a margin. For example, when it is allowed to set a margin large enough to include both the interlock area A22 in FIG. 7A and the interlock area A22 in FIG. 7B, the interlock area identification unit 315 may set the interlock area so as to surround the operation target position (for example, the operation target part 92M) with a predetermined margin.

For example, the interlock area surrounding the operation target part 92M with a margin of two sections is identified to include operation target parts 92B, 92C, 92D, 92E, 92F, 92K, 92L, 92M, 92N, and 92P. The interlock area includes both the interlock area A22 in FIG. 7A and the interlock area A22 in FIG. 7B.

The workability determination unit 316 may check an overlap between the interlock area and the occupying area. For example, the workability determination unit 316 determines whether the robot 3A can perform the operation on the workpiece 90 based on whether the interlock area overlaps an occupying area of an object other than the robot 3A (for example, the robots 3B, 3C, or the worker 9). For example, when the interlock area does not overlap the occupying area of an object other than the robot 3A, the workability determination unit 316 determines that the robot 3A can perform the operation on the selected part. On the other hand, when the interlock area overlaps the occupying area of an object other than the robot 3A, the interlock unit determines that the robot 3A cannot perform the operation on the selected part. The workability determination unit 316 may check the overlap based on a comparison between the first set and the second set of the plurality of sections.

Figure 8:
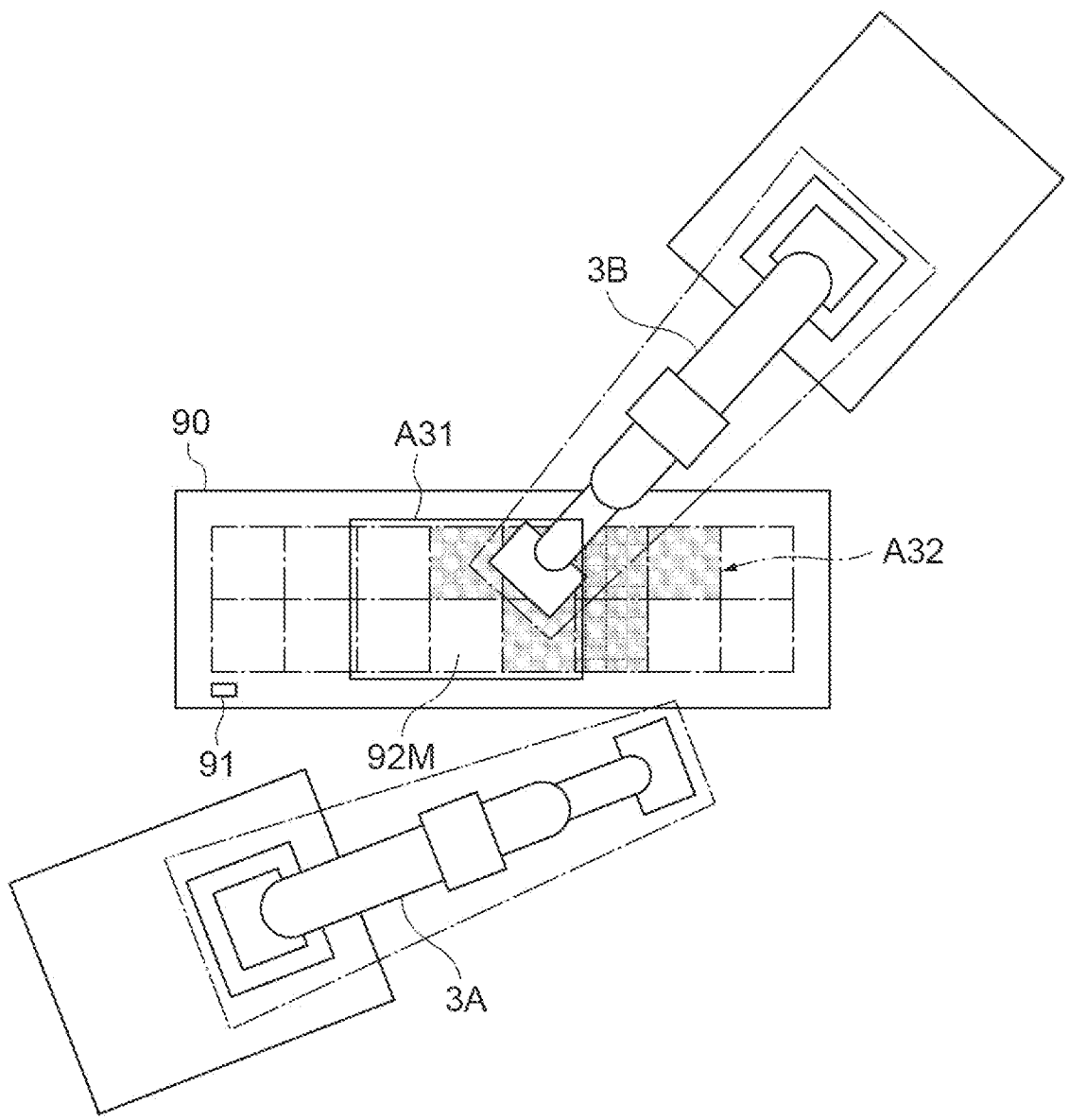
FIG. 8 is a schematic diagram illustrating an example operation of the robot system where the interlock area and the occupying area overlap.

As an example, FIG. 8 illustrates an example case where an interlock area A31 for the operation target part 92M, which is a selected part, overlaps an occupying area A32 of the robot 3B. In this example, the workability determination unit 316 determines that the robot 3A cannot perform the operation on the operation target part 92M.

Figure 9:
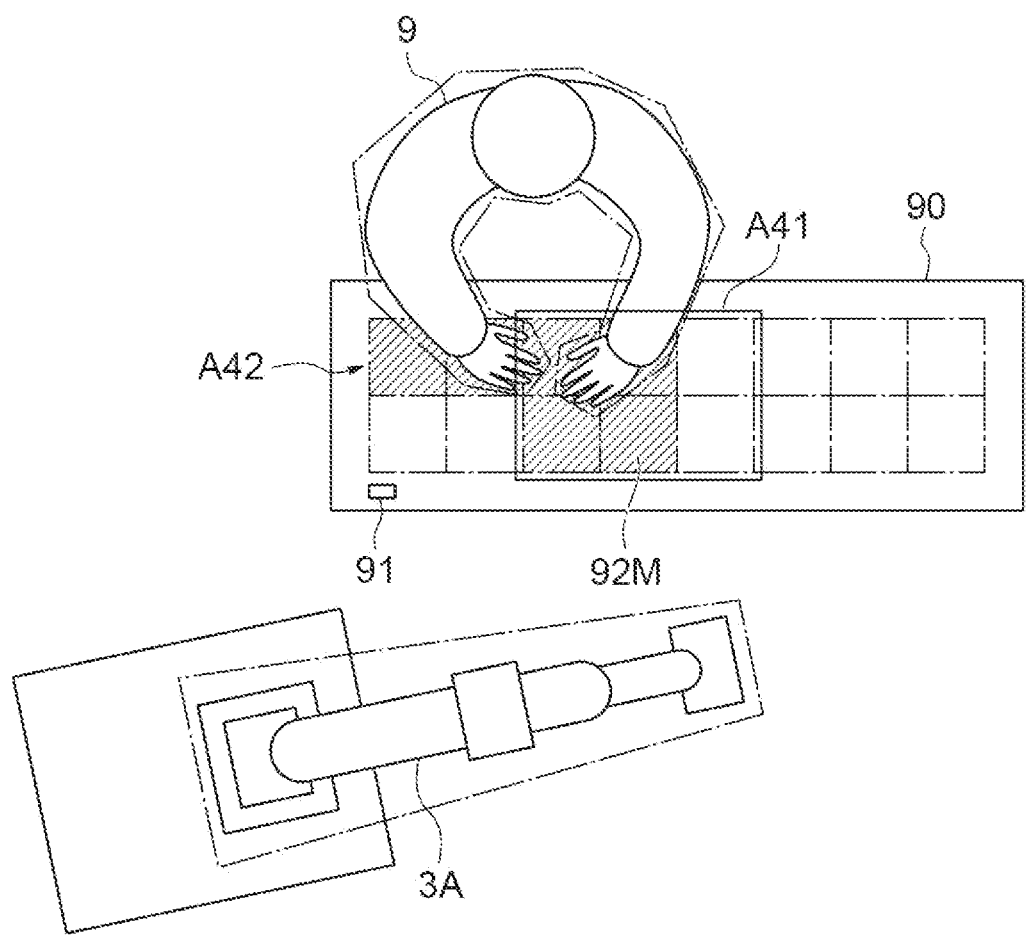
FIG. 9 is a schematic diagram illustrating an example operation of the robot system where the interlock area and the occupying area overlap.

FIG. 9 illustrates an example case where an interlock area A41 for the operation target part 92M, which is a selected part, overlaps an occupying area A42 of the worker 9. Also in this example, the workability determination unit 316 determines that the robot 3A cannot execute the operation on the operation target part 92M.

Figure 10:
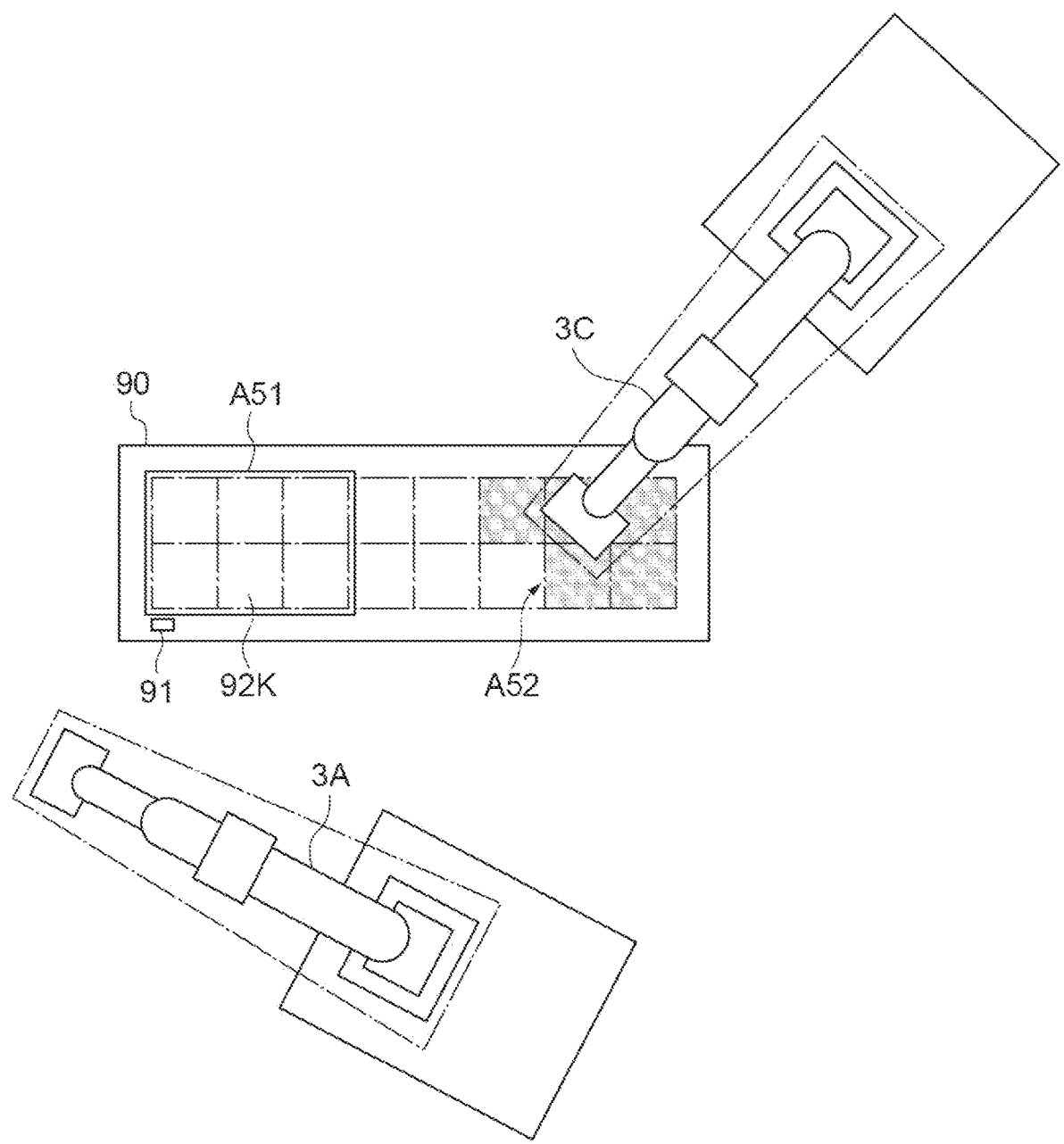
FIG. 10 is a schematic diagram illustrating an example operation of the robot system where the interlock area and the occupying area do not overlap.
Figure 11:
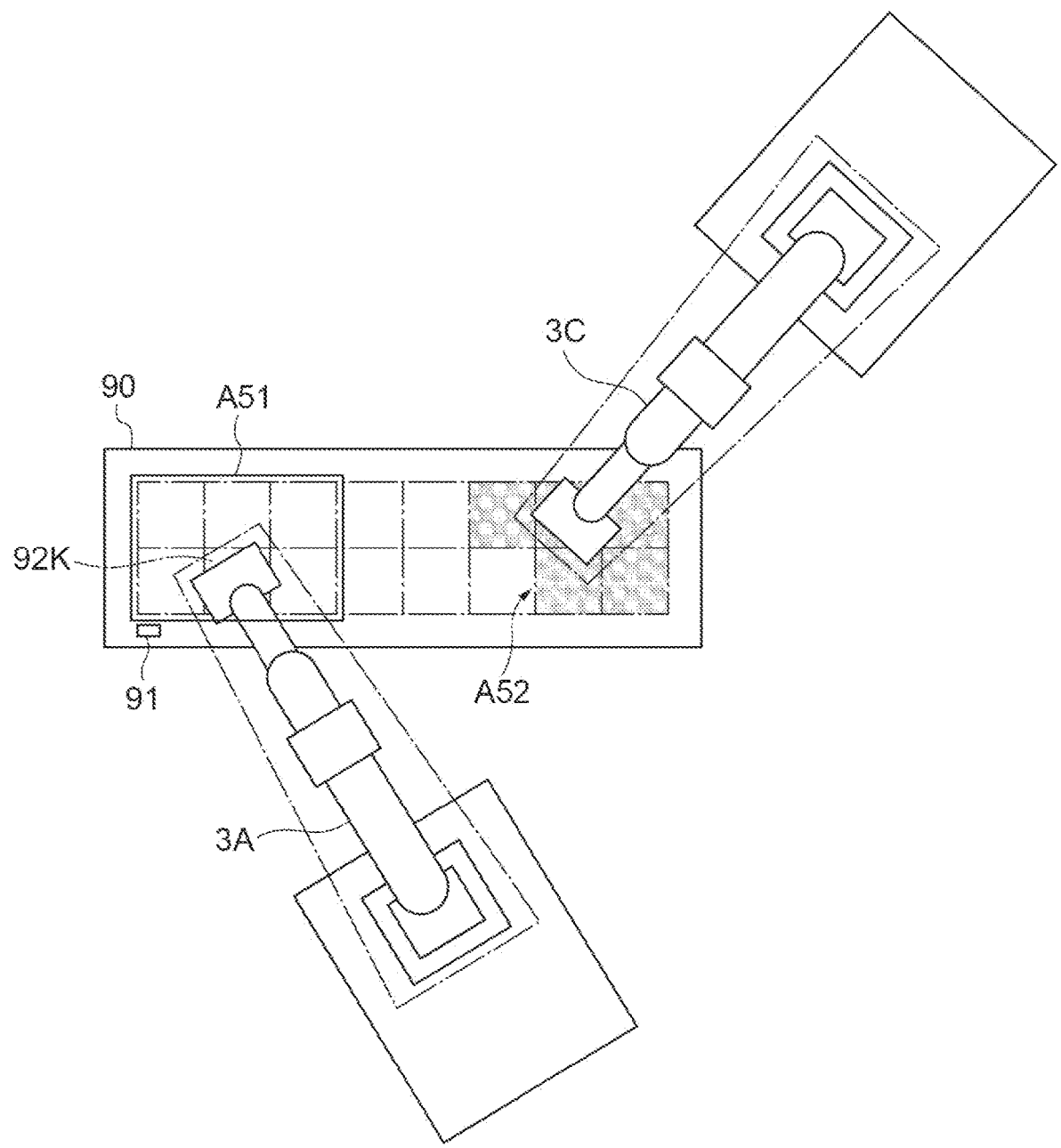
FIG. 11 is a schematic diagram illustrating an example operation of the robot system where the interlock area and the occupying area do not overlap.

FIG. 10 illustrates an example case where an interlock area A51 for the operation target part 92K, which is a selected part, does not overlap an occupying area A52 of the robot 3C. In this example, the workability determination unit 316 determines that the robot 3A can execute the operation on the operation target part 92K. As a result, the robot 3A and the 3C can simultaneously execute operations on the same the workpiece 90 (see FIG. 11).

The control execution unit 317 controls the robot 3A based on the current position of the workpiece 90 when the workability determination unit 316 determines that the operation is possible. For example, the control execution unit 317 controls the robot 3A based on the modified program which is modified based on the current position of the workpiece 90. For example, the angle target values of the joints 31, 32, 33, 34, 35, and 36 are calculated by inverse kinematics calculation so as to displace the tip 18 of the robot 3A in accordance with the modified program, and each angle of the joints 31, 32, 33, 34, 35, and 36 is made to follow the angle target values by the actuators 41, 42, 43, 44, 45, and 46.

The robot controller 300 may be configured to control the robot 3A further based on operation target image data generated by the operation target camera 51 provided in the robot 3A. For example, the robot controller 300 may further include an operation object position detection unit 318.

The operation object position detection unit 318 acquires operation target image data generated by the operation target camera 51. The control execution unit 317 controls the robot 3A further based on the operation target image data acquired by the operation object position detection unit 318. For example, the control execution unit 317 identifies a positional deviation (for example, a deviation of the position and posture of the tip 18 with respect to the selected part) based on the operation target image data, corrects the target position and target posture of the tip 18 so as to reduce (compensate) the identified deviation, and controls the robot 3A based on the corrected target position and target posture.

Although the example configuration in which the workability determination unit 316 determines that the operation is possible and then the robot 3A starts the operation on the selected part has been described above, the configuration is not limited thereto. The control execution unit 317 may pause the robot 3A after controlling the robot 3A to execute the operation on the selected part halfway, and wait for the workability determination unit 316 to determine that the operation is possible.

The control execution unit 317 may generate an operation program corresponding to a current position of the workpiece 90 in real time without being based on an operation program generated in advance, and control the robot 3A based on the generated operation program. In this example, the program modification unit 313 and the modified program storage unit 314 can be omitted.

Similarly to the robot controller 300A, the robot controller 300B is configured to: identify an interlock area that moves together with the workpiece 90 based on the current position of the workpiece 90; determine whether the robot 3B can execute operation on the workpiece 90 based on whether the interlock area overlaps an occupying area of an object other than the robot 3B; and control the robot 3B to execute operation on the workpiece 90 based on the current position of the workpiece 90 when it is determined that the operation is possible.

A robot controller 300C is configured to: identify an interlock area that moves together with the workpiece 90 based on the current position of the workpiece 90; determine whether the robot 3C can execute operation on the workpiece 90 based on whether the interlock area overlaps an occupying area of an object other than the robot 3C; and control the robot 3C to execute operation on the workpiece 90 based on the current position of the workpiece 90 when it is determined that the operation is possible.

The configurations of the robot controller 300B and the 300C are the same as those of the robot controller 300A. Therefore, detailed description of the robot controller 300B and the 300C is omitted.

Figure 12:
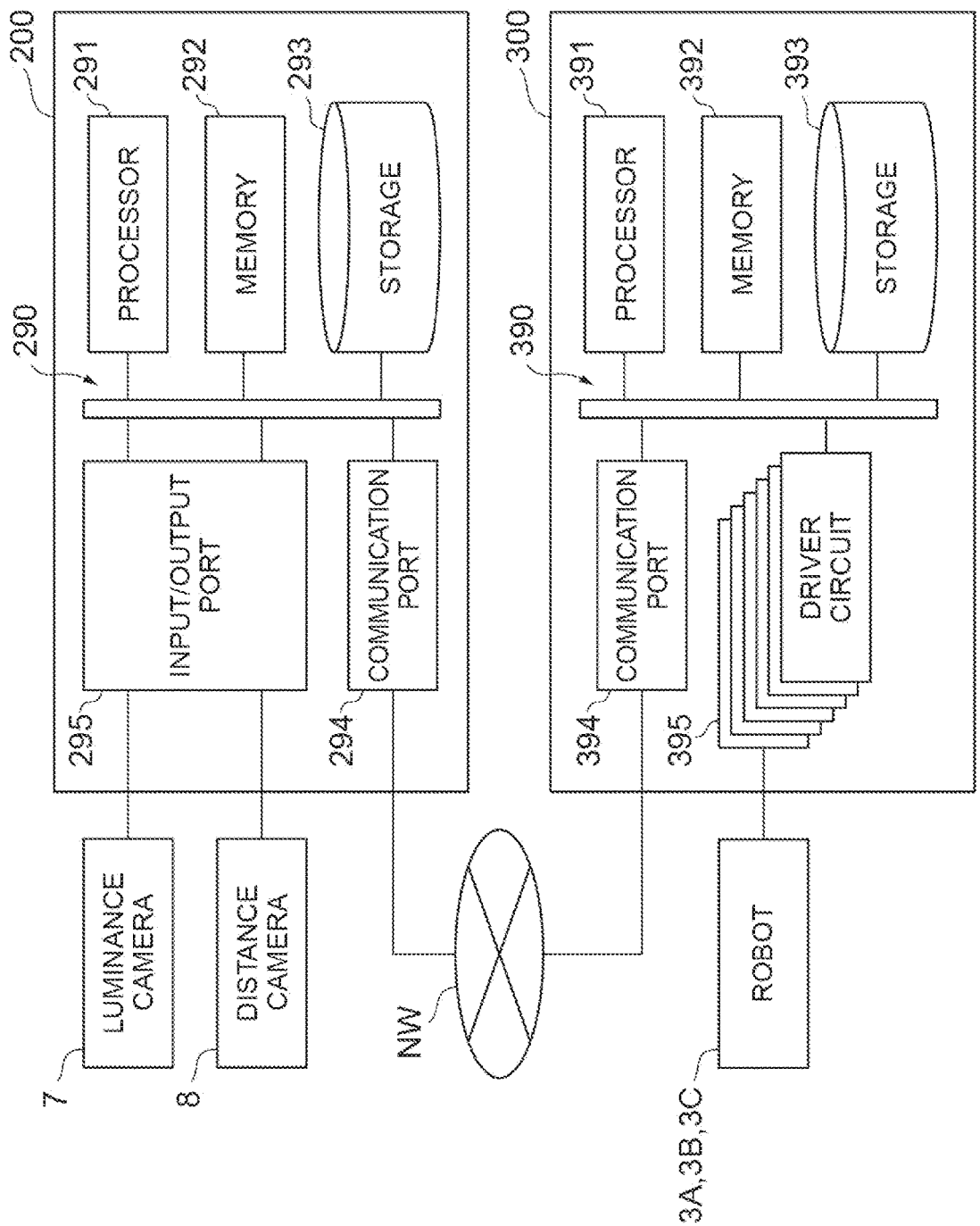
FIG. 12 is a block diagram illustrating an example hardware configuration of the environment identification device and the robot controller.

FIG. 12 is a block diagram illustrating a hardware configuration of the environment identification device 200 and the robot controller 300. As illustrated in FIG. 12, the environment identification device 200 includes circuitry 290. The circuitry 290 includes one or more processor(s) 291, a memory 292, storage 293, a communication port 294, and an input/output port 295. The storage 293 includes a computer-readable storage medium such as a nonvolatile semiconductor memory. The storage 293 stores a program for controlling the environment identification device 200 to identify a current position of the workpiece 90 in the conveying device 2 and an occupying area of one or more objects in the vicinity of the workpiece 90. For example, the storage 293 stores a program for configuring the above-described functional blocks in the environment identification device 200.

The memory 292 temporarily stores the program loaded from the storage medium of the storage 293 and the calculation result by the processor 291. The processor 291 configures each functional block of the environment identification device 200 by executing the program in cooperation with the memory 292. The communication port 294 communicates with the robot controller 300 via a network NW in accordance with instructions from the processor 291. The input/output port 295 inputs and outputs information to and from the luminance camera 7 and the distance camera 8 in accordance with instructions from the processor 291.

The robot controller 300 includes circuitry 390. The circuitry 390 includes one or more processor(s) 391, a memory 392, storage 393, a communication port 394, and a driver circuit 395. The storage 393 includes a computer-readable storage medium such as a nonvolatile semiconductor memory. The storage 393 stores a program for controlling the robot controller 300 to: identify an interlock area that moves together with the workpiece 90 based on the current position of the workpiece 90; determine whether the robots 3A, 3B, and 3C can execute operation on the workpiece 90 based on whether the interlock area overlaps an occupying area of an object other than the robots 3A, 3B, and 3C; and control the robots 3A, 3B, and 3C to execute operation on the workpiece 90 based on the current position of the workpiece 90 when it is determined that the operation is possible. For example, the storage 393 stores a program for configuring the above-described functional blocks in the robot controller 300.

The memory 392 temporarily stores the program loaded from the storage medium of the storage 393 and the calculation result by the processor 391. The processor 391 configures each functional block of the robot controller 300 by executing the program in cooperation with the memory 392. The communication port 394 communicates with the environment identification device 200 via the network NW in accordance with instructions from the processor 391. The driver circuit 395 outputs drive power to the robot 3A, 3B, and 3C in accordance with instructions from the processor 391.

It should be noted that the circuitry 290 and 390 may not be limited to one that configures each function by a program. For example, the circuitry 290 and 390 may configure at least a part of the functions by dedicated logic circuitry or an application specific integrated circuit (ASIC) in which the dedicated logic circuitry is integrated.

Control Procedure

Next, an example control procedure executed by the control system 100 will be described as an example of the control method. This procedure includes an environment identification procedure executed by the environment identification device 200 and a robot control procedure executed by the robot controller 300. Hereinafter, each procedure will be described in detail.

Environment Identification Procedure

Figure 13:
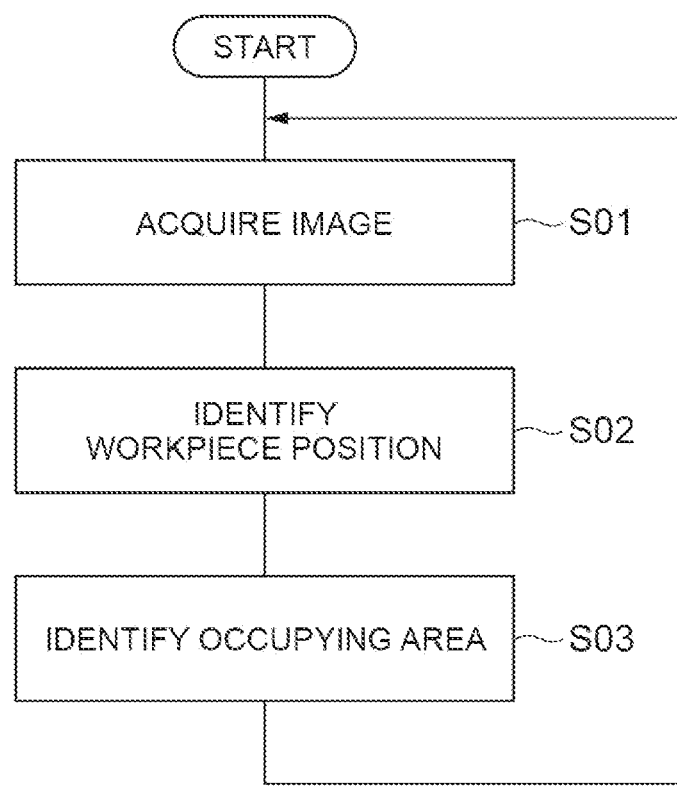
FIG. 13 is a flowchart illustrating an example environment identification procedure.

As illustrated in FIG. 13, the environment identification device 200 executes operations S01, S02, and S03. In the operation S01, the image data acquisition unit 211 acquires the environment image data generated by the environment imaging device 6. In the operation S02, the workpiece position detection unit 213 identifies the current position of the workpiece 90 based on the environment image data. In the operation S03, the occupying area detection unit 214 identifies an occupying area of one or more objects based on the environment image data. The environment identification device 200 repeats the above procedure.

Robot Control Procedure

The robot control procedure is common to the robot controllers 300A, 300B, and 300C. Accordingly, the robot control procedure executed by the robot controller 300A will be described below, and the description of the robot control procedures executed by the robot controller 300B and 300C will be omitted.

This procedure includes: identifying an interlock area that moves together with the workpiece 90 based on the current position of the workpiece 90; determining whether the robot 3A can execute operation on the workpiece 90 based on whether the interlock area overlaps an occupying area of an object other than the robot 3A; and controlling the robot 3A to execute the operation on the workpiece 90 based on the current position of the workpiece 90 when it is determined that the operation is possible.

Figure 14:
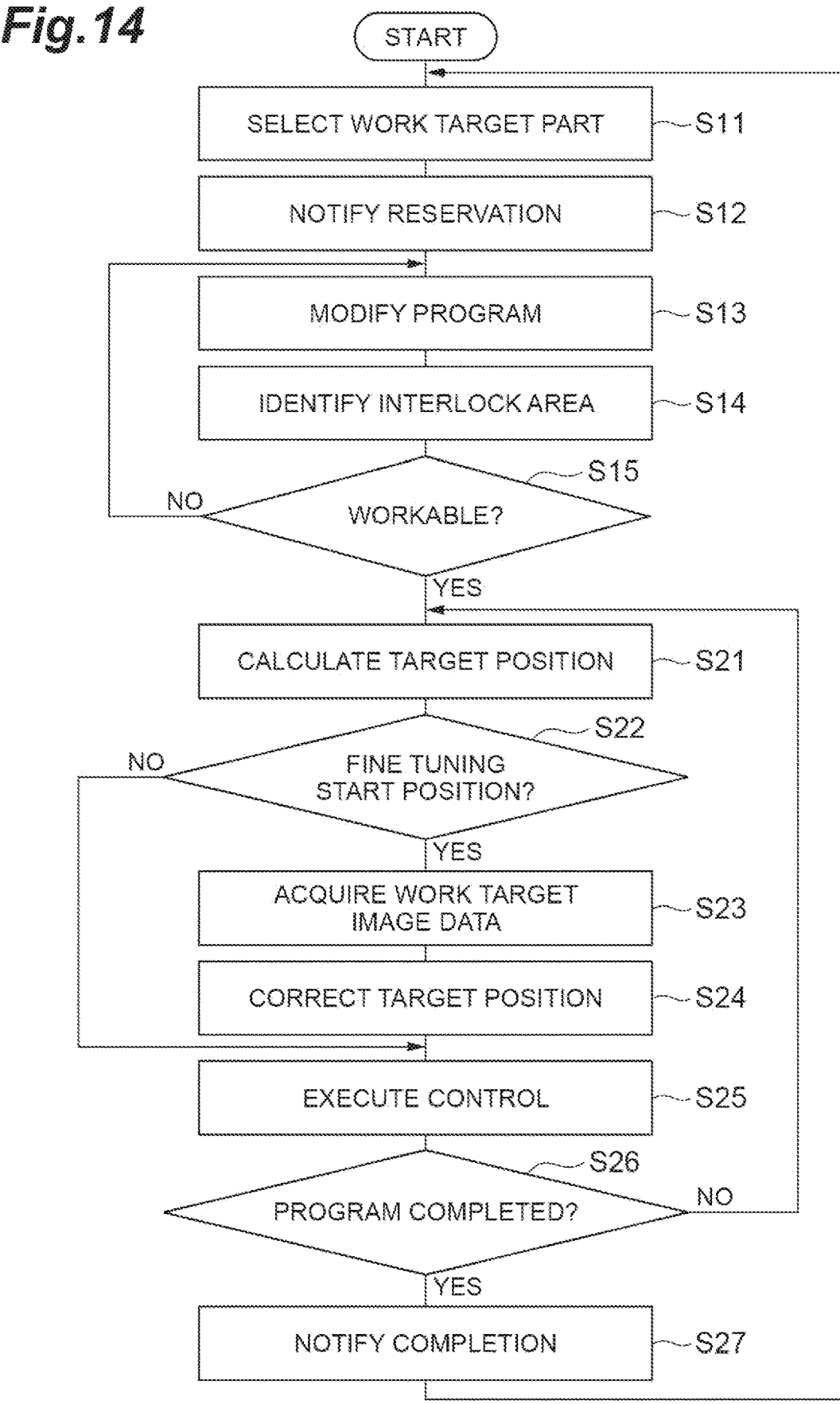
FIG. 14 is a flowchart illustrating an example robot control procedure.

As illustrated in FIG. 14, the robot controller 300 first executes operations S11, S12, S13, S14, and S15. In the operation S11, the operation target selection unit 312 selects one of two or more territory parts based on the progress information stored in the progress storage unit 216, the current position of the workpiece 90 identified by the workpiece position detection unit 213, and the current position of the robot 3A. In the operation S12, the operation target selection unit 312 requests the progress management unit 217 to change the selected part to "reserved". The progress management unit 217 updates the progress information of the progress storage unit 216 so as to set the selected part to "reserved". In the operation S13, the program modification unit 313 modifies the operation program for the selected part based on the current position of the workpiece 90.

In the operation S14, the interlock area identification unit 315 identifies an interlock area that moves together with the workpiece 90 based on the current position of the workpiece 90. In the operation S15, based on whether the interlock area overlaps the occupying area of another object other than the robot 3A (for example, the robot 3B, 3C, or the worker 9), the workability determination unit 316 determines whether the robot 3A can execute the operation on the workpiece 90.

If it is determined in the operation S15 that the robot 3A cannot execute the operation on the workpiece 90, the robot controller 300 returns the processing to the operation S13. Thereafter, the modification of the operation program based on the current position of the workpiece 90, the identification of the interlock area based on the current position of the workpiece 90, and the determination of whether the operation is possible are repeated until it is determined that the robot 3A can execute the operation on the workpiece 90.

If it is determined in the operation S15 that the robot 3A can execute the operation on the workpiece 90, the robot controller 300 repeatedly executes control of the robot 3A based on the modified program in a predetermined control cycle.

First, the robot controller 300 executes operations S21 and S22. In the operation S21, the control execution unit 317 calculates the target position and target posture of the tip 18 in the current control cycle based on the modified program. In the operation S22, the control execution unit 317 checks whether the tip 18 has reached a predetermined fine adjustment start position. As an example, the fine adjustment start position is a position at which at least a part of the selected part is included in the operation target image data.

If it is determined in the operation S22 that the tip 18 has not reached the fine adjustment start position, the robot controller 300 executes operations S25 and S26. In the operation S25, the actuators 41, 42, 43, 44, 45, and 46 drives the joints 31, 32, 33, 34, 35, and 36 so that the control execution unit 317 controls the tip 18 to follow the calculated target position and target posture. In the operation S26, the control execution unit 317 checks whether control according to all motion commands of the operation program is completed.

If it is determined in the operation S26 that the control according to a part of the motion commands of the operation program is not completed, the robot controller 300 returns the processing to the operation S21. Thereafter, the control of the robot 3A based on the modified program is repeated in the above-described control cycle until the control according to all the motion commands is completed.

In this repetition, if it is determined in the operation S22 that the tip 18 has reached the fine adjustment start position, the robot controller 300 executes operations S23 and S24 before the operation S25. In the operation S23, the operation object position detection unit 318 acquires operation target image data generated by the operation target camera 51. In the operation S24, the control execution unit 317 identifies the deviation of the position and posture of the tip 18 with respect to the selected part based on the operation target image data, and corrects the target position and target posture of the tip 18 so as to reduce the identified deviation. Thereafter, the control of the robot 3A based on the modified program and the operation target image data is repeated in the above-described control cycle until the control according to all the motion commands is completed.

If is it determined in the operation S26 that control according to all motion commands of the operation program is completed, the robot controller 300 executes a operation S27. In the operation S27, the operation target selection unit 312 requests the progress management unit 217 to change the selected part to "finished". The progress management unit 217 updates the progress information of the workability determination unit 316 so as to set the selected part to "finished". Thus, the robot control procedure is completed.

Effects of Present Embodiment

As described above, the robot system 1 includes the conveying device 2 configured to convey the workpiece 90; the environment identification device 200 configured to identify the current position of the workpiece 90 and the occupying area of one or more objects; and the robot controller 300 configured to control the robots 3A, 3B, and 3C to execute the operation on the workpiece 90, and the robot controller 300 includes: the interlock area identification unit 315 configured to identify, based on the current position of the workpiece 90, the interlock area moving together with the workpiece 90; the workability determination unit 316 configured to determine whether the robot 3A, 3B, and 3C can execute the operation on the workpiece 90 based on whether the interlock area overlaps the occupying area of an object other than the robots 3A, 3B, and 3C; and the control execution unit 317 configured to control the robots 3A, 3B, and 3C based on the current position of the workpiece 90 when the workability determination unit 316 determines that the operation is possible.

The robot system 1 determines whether the robots 3A, 3B, and 3C can execute the operation on the workpiece 90 based on whether the interlock area that moves together with the workpiece 90 interferes with an occupying area of another object. Therefore, even in a situation where the workpiece 90 as the operation target is transported by the conveying device 2 and moves, when the robot execute the operation on the workpiece 90 as the operation target, whether the robots 3A, 3B, and 3C may collide with another object may be evaluated and whether the robots 3A, 3B, and 3C can execute the operation may be determined. Therefore, the robot system 1 may flexibly adapt to environmental changes.

The robot controller 300 may further include the program modification unit 313 configured to modify the predetermined operation program based on the current position of the workpiece 90, and the control execution unit 317 may be configured to control the robots 3A, 3B, and 3C based on the modified operation program when the workability determination unit 316 determines that the operation is possible. The position of the workpiece 90 when it is determined that the operation is possible changes depending on the timing at which the operation becomes possible during conveyance. Accordingly, the motions of the robots 3A, 3B, and 3C should be adapt to the position of the workpiece 90 when it is determined that the operation is possible. On the other hand, the robot system 1 modifies a predetermined operation program based on the current position of the workpiece 90. Therefore, the operations of the robots 3A, 3B, and 3C can be adapted to the position of the workpiece 90 when it is determined that the operation is possible.

The environment identification device 200 may be configured to identify an occupying area of one or more objects in the check target area 93 that moves together with the workpiece 90. In this example, the processing load in the robot controller 300 may be reduced by reducing the area to be checked for overlap with the interlock area among the one or more occupying areas.

The robot system 1 may further include the robot controller 300 (a second controller) for controlling the robot 3A, 3B, and 3C (a second robot) to execute the operation on the workpiece 90 in an operation range overlapping the operation range of the robots 3A, 3B, and 3C, and the second controller may include: the interlock area identification unit 315 configured to identify a second interlock area that moves together with the workpiece 90 based on the current position of the workpiece 90; a workability determination unit (a second workability determination unit) configured to determine whether the second robot can execute the operation on the workpiece 90 based on whether the second interlock area overlaps an occupying area of an object other than the second robot; and the control execution unit 317 configured to control the second robot based on the current position of the workpiece 90 when the second workability determination unit determines that operation is possible. In this example, the flexible adaptability to environmental changes may be utilized for adjustment of operation timings of the robot 3A, 3B, and 3C whose operation ranges overlap each other.

The occupying area of the object other than the robot 3A, 3B, and 3C may include the human occupying area occupied by the worker 9. In this example, whether operations by the robots 3A, 3B, and 3C is possible may be determined even in an operation environment where a person cooperates with the robots 3A, 3B, and 3C.

The robot system 1 may further include the environment imaging device 6 configured to image the target area including the workpiece conveyed by the conveying device 2 to generate the environment image data, and the environment identification device 200 may be configured to identify the current location of the workpiece 90 and the occupying area of one or more objects based on the environment image data. In this example, by improving the reliability of the environment information, the reliability of the operations of the robots 3A, 3B, and 3C based on the environment information may be improved.

The environment imaging device 6 may be configured to generate the environment image data including the distance image data and the luminance image data for the target area, and the environment identification device 200 may be configured to identify the occupying area of the one or more objects based on the distance image data and the luminance image data. In this example, the reliability of the environment information can be further improved by using both the distance image data and the luminance image data.

The environment identification device 200 may be configured to recognize the marker 91 attached to the workpiece 90 based on the environment image data, and to identify the current position of the workpiece 90 based on the position of the marker 91 in the target area. In this example, the environment image data can also be used to detect the position of the workpiece 90.

The interlock area identification unit 315 may be configured to identify the planned occupying area of the robots 3A, 3B, and 3C in the case of executing the operation on the workpiece 90 based on the modified operation program, and to identify the interlock area based on the planned occupying area. In this example, a case where it is determined that the operation is impossible although the operation is actually possible may be reduced, and the operation efficiency of the robots 3A, 3B, and 3C may be improved.

The interlock area identification unit 315 may be configured to identify the interlock area so as to surround the operation target positions of the robots 3A, 3B, and 3C with a predetermined margin based on the current position of the workpiece 90. In this example, the process of identifying the interlock area can be simplified, and the processing load on the robot controller 300 can be reduced.

The check target area may include a plurality of sections, the environment identification device 200 may be configured to the occupying area of the one or more objects in units of the plurality of sections, and the interlock area identification unit 315 may be configured to identify the interlock area in units of the plurality of sections. In this example, the process of identifying one or more robot overlapping areas and the process of identifying the interlock area may be simplified, and the processing load in the environment identification device 200 and the robot controller 300 may further be reduced.

The environment identification device 200 may be configured to identify a new occupying area of the one or more objects based on new distance image data, new luminance image data, and an image recognition model generated through machine learning so as to output the occupying area of the one or more objects based on input data including the distance image data and the luminance image data. In this example, one or more robot occupying areas may be reliably identified based on the distance image data and the luminance image data by utilizing the machine learning.

The robots 3A, 3B, and 3C may include the robot body 4, the conveying carriage 5 that holds and conveys the robot body 4, and the operation target camera 51 (the operation target imaging device) configured to image the operation area of the robot body to generate the operation target image data, and the control execution unit 317 may be configured to control the robots 3A, 3B, and 3C further based on the operation target image data. In this example, the operation accuracy of the robots 3A, 3B, and 3C with respect to the workpiece 90 may be maintained even in a situation where a positional deviation of the conveying carriage 5 may occur.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:
1. A robot system comprising:
a conveying device configured to convey a workpiece;
a robot configured to execute an operation on the workpiece; and
circuitry configured to:
identify a current position of the workpiece and an object area occupied by an object;
identify an interlock area including at least one target position of the robot for executing the operation;
check an overlap between the interlock area and the object area;
control the robot to delay executing the operation in response to determining that the interlock area overlaps the object area;
modify the interlock area according to a change in the current position of the workpiece being conveyed by the conveying device;
check an overlap between the modified interlock area and the object area; and control the robot to execute the operation based on the current position of the workpiece in response to determining that the modified interlock area does not overlap the object area.

2. The robot system according to claim 1, wherein the circuitry is configured to:
store a program for controlling the robot to execute the operation on the workpiece;
modify the program based on the current position of the workpiece for controlling the robot to execute the operation on the workpiece being conveyed by the conveying device; and
control the robot based on the modified program in response to determining that the modified interlock area does not overlap the object area.

3. The robot system according to claim 2, wherein the circuitry is configured to:
identify, based on the modified program, an operation area occupied by the robot during the operation on the workpiece; and
modify the interlock area based on the operation area.

4. The robot system according to claim 1, wherein the circuitry is further configured to:
store a program for controlling the robot to execute the operation on the workpiece, wherein the program comprises a plurality of sequential target positions including the at least one target position of the robot, each of the plurality of sequential target positions being associated with a fixed reference position relative to the conveying device;
modify the program based on the current position of the workpiece for controlling the robot to execute the operation on the workpiece being conveyed by the conveying device, wherein the modified program includes a modification of at least one of the plurality of sequential target positions based on a difference between the current position of the workpiece being conveyed by the conveying device and the fixed reference position; and
control the robot based on the modified program in response to determining that the modified interlock area does not overlap the object area.

5. The robot system according to claim 1, wherein the workpiece includes a boundary, and
wherein the circuitry is configured to identify the object area within the boundary of the workpiece.

6. The robot system according to claim 5, wherein the circuitry is configured to check the overlap between the interlock area and the object area within the boundary of the workpiece.

7. The robot system according to claim 5, wherein the boundary includes a plurality of sections, and
wherein the circuitry is configured to:
define the object area based on a first set of the plurality of sections;
define the interlock area based on a second set of the plurality of sections; and
check the overlap based on a comparison between the first set and the second set.

8. The robot system according to claim 1, wherein the object is a second robot configured to execute a second operation on the workpiece.

9. The robot system according to claim 1, wherein the object area is a human area occupied by a human worker.

10. The robot system according to claim 1, wherein the circuitry is configured to identify the current position of the workpiece and the object area based on image data of imaging target including the workpiece conveyed by the conveying device and the object, and
wherein the image data comprises:
distance image data including first pixels each of which is associated with a distance from a camera to a portion of the imaging target; and
luminance image data including second pixels each of which is associated with a luminance of a portion of the imaging target.

11. The robot system according to claim 10, wherein the circuitry is configured to identify the object area based on the distance image data, the luminance image data, and an image recognition model generated through machine learning so as to output the object area in response to an input of the distance image data and the luminance image data.

12. The robot system according to claim 1, wherein the circuitry is configured to:
recognize a marker attached to the workpiece based on image data of the workpiece; and
identify the current position of the workpiece based on a position of the marker in the image data.

13. The robot system according to claim 1, wherein the robot is configured to act on a work position of the workpiece during the operation, and
wherein the circuitry is further configured to:
identify the work position based on the current position of the workpiece being conveyed by the conveying device; and
identify the interlock area so as to surround the work position with a margin.

14. The robot system according to claim 1, further comprising an imaging device fixed to the robot configured to image the workpiece, and
wherein the circuitry is configured to:
receive an image data of the workpiece from the imaging device; and
modify the operation based on the image data of the workpiece.

15. The robot system according to claim 14, further comprising a mobile carriage that holds and conveys the robot,
wherein the circuitry is configured to modify the operation to compensate, based on the image data of the workpiece, a positional deviation of the robot with respect to the workpiece.

16. A controller comprising circuitry configured to:
identify an interlock area including at least one target position of the robot for executing an operation on a workpiece being conveyed by a conveying device;
check an overlap between the interlock area and the object area occupied by an object;
control the robot to delay executing the operation in response to determining that the interlock area overlaps the object area;
modify the interlock area according to a change in a current position of the workpiece;
check an overlap between the modified interlock area and the object area; and
control the robot to execute the operation on the workpiece based on the current position of the workpiece in response to determining that the modified interlock area does not overlap the object area.

17. A control method comprising:
identifying an interlock area including at least one target position of the robot for executing an operation on a workpiece being conveyed by a conveying device;

checking an overlap between the interlock area and the object area occupied by an object;

controlling the robot to delay executing the operation in response to determining that the interlock area overlaps the object area;

modifying the interlock area according to a change in a current position of the workpiece;

checking an overlap between the modified interlock area and the object area; and controlling the robot to execute the operation on the workpiece based on the current position of the workpiece in response to determining that the modified interlock area does not overlap the object area.

18. The control method according to claim 17, wherein said checking includes checking the overlap between the interlock area and the object area within a boundary of the workpiece.

19. The control method according to claim 17, further comprising:

storing a program for controlling the robot to execute the operation on the workpiece, wherein the program comprises a plurality of sequential target positions including the at least one target position of the robot, each of the plurality of sequential target positions being associated with a fixed reference position relative to the conveying device; and modifying the program based on the current position of the workpiece for controlling the robot to execute the operation on the workpiece being conveyed by the conveying device, wherein the modified program includes a modification of at least one of the plurality of sequential target positions based on a difference between the current position of the workpiece being conveyed by the conveying device and the fixed reference position, and wherein said controlling includes controlling the robot based on the modified program in response to determining that the modified interlock area does not overlap the object area.

20. The controller according to claim 16, wherein the circuitry is further configured to:

store a program for controlling the robot to execute the operation on the workpiece, wherein the program comprises a plurality of sequential target positions including the at least one target position of the robot, each of the plurality of sequential target positions being associated with a fixed reference position relative to the conveying device;

modify the program based on the current position of the workpiece for controlling the robot to execute the operation on the workpiece being conveyed by the conveying device, wherein the modified program includes a modification of at least one of the plurality of sequential target positions based on a difference between the current position of the workpiece being conveyed by the conveying device and the fixed reference position; and control the robot based on the modified program in response to determining that the modified interlock area does not overlap the object area.

\* \* \* \* \*